United States Patent
Allen et al.

(10) Patent No.: US 10,215,286 B2
(45) Date of Patent: Feb. 26, 2019

(54) DYNAMIC SEAL

(71) Applicant: Aktiebolaget SKF, Gothenburg (SE)

(72) Inventors: Warrick Allen, Hilversum (NL);
Stellario Barbera, Hilversum (NL)

(73) Assignee: Aktiebolaget SKF, Göteborg (SE)

( * ) Notice: Subject to any disclaimer, the term of this patent is extended or adjusted under 35 U.S.C. 154(b) by 26 days.

(21) Appl. No.: 15/509,032

(22) PCT Filed: Sep. 11, 2014

(86) PCT No.: PCT/EP2014/069364
§ 371 (c)(1),
(2) Date: Mar. 6, 2017

(87) PCT Pub. No.: WO2016/037652
PCT Pub. Date: Mar. 17, 2016

(65) Prior Publication Data
US 2017/0284546 A1    Oct. 5, 2017

(51) Int. Cl.
| F16C 33/76 | (2006.01) |
| F16J 15/324 | (2016.01) |
| F16J 15/328 | (2016.01) |
| F16J 15/3284 | (2016.01) |
| F16C 33/78 | (2006.01) |
| F16C 19/16 | (2006.01) |

(52) U.S. Cl.
CPC ......... *F16J 15/324* (2013.01); *F16C 33/7823* (2013.01); *F16J 15/328* (2013.01); *F16J 15/3284* (2013.01); *F16C 19/163* (2013.01)

(58) Field of Classification Search
CPC .... F16C 33/78; F16C 33/7816; F16C 33/782; F16C 33/7823; F16J 15/162; F16J 15/20; F16J 15/32; F16J 15/3204; F16J 15/3208; F16J 15/324; F16J 15/328; F16J 15/3284; F16J 15/3292; F16J 15/3404; F16J 15/3424; F16J 15/3496; F16J 15/444
See application file for complete search history.

(56) References Cited

U.S. PATENT DOCUMENTS

| 2,172,325 | A | * | 9/1939 | Victor ..................... F16C 33/74 |
| | | | | 277/564 |
| 4,055,205 | A | * | 10/1977 | Withoff ............... B30B 15/0052 |
| | | | | 100/269.21 |
| 4,327,924 | A | * | 5/1982 | Wheeler ............. B66B 11/0446 |
| | | | | 277/551 |
| 6,228,813 | B1 | * | 5/2001 | Yabe ....................... C08L 23/06 |
| | | | | 384/463 |
| 2012/0001395 | A1 | * | 1/2012 | Kurth ................... F16J 15/3284 |
| | | | | 277/412 |
| 2013/0147122 | A1 | * | 6/2013 | Shoji ................... G03G 15/0817 |
| | | | | 277/345 |

(Continued)

FOREIGN PATENT DOCUMENTS

| CN | 1349444 A | 5/2002 |
| CN | 101200832 A | 6/2008 |
| CN | 101765687 A | 6/2010 |

(Continued)

*Primary Examiner* — Phillip A Johnson
(74) *Attorney, Agent, or Firm* — Bryan Peckjian; SKF USA Inc. Patent Dept.

(57) ABSTRACT

A dynamic seal having a contact surface including a fabric is provided. A fatty acid ester is incorporated into the fabric.

20 Claims, 2 Drawing Sheets

(56) References Cited

U.S. PATENT DOCUMENTS

2014/0167361 A1\* 6/2014 Osada .................. F16J 15/3412
277/400

FOREIGN PATENT DOCUMENTS

| CN | 102439335 | A |   | 5/2012 |             |
|----|-----------|---|---|--------|-------------|
| CN | 102978960 | A |   | 3/2013 |             |
| CN | 103189552 | A |   | 7/2013 |             |
| EP | 1464879   | A1|   | 10/2004|             |
| GB | 580136    | A | * | 8/1946 | F16J 15/324 |
| JP | 2004308906| A | * | 11/2004| F16J 15/3284|
| JP | 4851114   | B2|   | 1/2012 |             |

\* cited by examiner

DYNAMIC SEAL

CROSS REFERENCE

This is a United States National Stage Application claiming the benefit of International Application Number PCT/EP2014/069364 filed on 9 Nov. 2014, which is incorporated herein by reference in its entirety.

FIELD OF THE INVENTION

The present invention relates generally to the field of seals and, in particular, to an improved dynamic seal. Such a dynamic seal may find use, for example, in a rolling element bearing.

BACKGROUND OF THE INVENTION

Seals are used to prevent leakage between two environments. Seals can be used, for example, to retain a fluid, separate fluids or to prevent the transmission of particulate contaminants from one environment to another.

Dynamic seals are used to seal passages between machine components that move relative to each other, either linearly or in the circumferential direction. There are various types of dynamic seals, including packing and piston seal rings, which are used for linear or oscillating movements. However, the most common seal is the radial shaft seal, which is used in a wide variety of applications in all branches of industry.

Dynamic seals are employed to retain lubricant, prevent water ingress and to prevent particulate, such as grit, contamination of the contact surfaces between the machine components (for example, the contact surfaces between the rolling elements and inner and/or outer rings of a rolling element bearing). However, as will be appreciated, friction during use leads to wear on the seal which will eventually lead to failure of the seal. In addition, the friction may reduce the efficiency of the device in which the dynamic seal is employed. For example, high levels of friction are generated within a shaft bearing as a result of the sliding contact between the surfaces of the metal shaft and the rubber bearing seal itself. Accordingly, there is a need for a dynamic seal (such as a dynamic bearing seal) exhibiting a low coefficient of friction. Such a seal would result in substantial energy savings, and would also be less likely to fail prematurely due to accelerated heat ageing of the seal.

Elastomer seals have remained popular for a number of dynamic sealing applications by virtue of a number of beneficial properties including good sealing performance, resistance to oils at elevated temperatures and low cost. However, one drawback is the necessity to maintain constant lubrication to avoid the high friction experienced when elastomers are run dry or in a starved condition. Traditionally, two alternative methods of lubrication are adopted for such seals: oil lubrication and grease lubrication. Oil lubrication enables the seal to be run at higher speeds with typically lower friction. However, it also necessitates the use of a more elaborate and expensive pumping system in order to ensure that a layer of lubricating oil is maintained at the contact surface. Grease lubrication offers lower cost and convenience but typically offers a slightly lower performance and may require changing during the lifetime. Grease systems commonly show a limited lifetime as a consequence of the grease being mobile in the vicinity of the sealing surface causing eventual starvation of lubricant.

There is a desire for a seal that will overcome, or at least mitigate, some or all of the problems associated with the seals of the prior art or at least a useful or optimized alternative.

BRIEF SUMMARY OF THE INVENTION

In a first aspect, the present invention provides a dynamic seal having a contact surface comprising a fabric, wherein a fatty acid ester is incorporated into the fabric.

Each aspect or embodiment as defined herein may be combined with any other aspect(s) or embodiment(s) unless clearly indicated to the contrary. In particular, any features indicated as being preferred or advantageous may be combined with any other feature indicated as being preferred or advantageous.

The term "dynamic seal" as used herein encompasses a seal to be used in contact with sliding surfaces. Dynamic seals are used to seal passages between machine components that move relative to each other either linearly or in the circumferential direction. A dynamic seal is a structure for hindering or substantially preventing egress of lubricant and/or ingress of foreign bodies.

The term "contact surface" used herein with regard to a dynamic seal encompasses a surface of the seal which, in use, is in sliding sealing contact with a counter surface.

The term "fatty acid" as used herein encompasses a carboxylic acid with a long aliphatic tail (chain) of from 4 to 28 carbon atoms. The aliphatic tail may be either saturated or unsaturated. The aliphatic tail may be either branched or unbranched.

The term "fatty acid ester" as used herein encompasses a type of ester that results from the combination of a fatty acid with an alcohol, or a fatty acid chloride with an alcohol.

The term "cellulose" as used herein encompasses an organic compound with the formula $(C_6H_{10}O_5)_n$, a polysaccharide consisting of a linear chain of several hundred to many thousands of $\beta(1\rightarrow 4)$ linked D-glucose units.

The inventors have surprisingly found that the dynamic seal of the present invention exhibits a low working friction.

Prior to use, the dynamic seal is loaded with a lubricant, typically oil, to lubricate the relative motion of the dynamic seal with the sliding surfaces (for example, the inner and outer rings of a rolling element bearing). In use, such relative motion may cause lubricant to become distributed away from the contact surface between the dynamic seal with the sliding surfaces.

The fatty acid ester, in particular the long aliphatic tail of the fatty acid ester, is oleophilic. Without being bound by theory, it is considered that there is a strong interaction between the long aliphatic tail of the fatty acid ester group with the large alkyl groups typically present in lubricating oils (for example poly alpha olefin oils). This may lead to a large number of Van der Waals' type attractive forces between the oil molecules and the fatty acid ester. Accordingly, in use, when the dynamic seal is loaded with lubricating oil, the fatty acid ester at the contact surface may maintain a lubricating layer of oil molecules at the contact surface. As a result, the friction of the dynamic seal is reduced, thereby increasing the working lifetime of the dynamic seal and reducing the energy required to cause relative motion of the sliding surfaces. The reduced friction may be exhibited over a wide range of operating temperatures and operating speeds. The reduced friction may be particularly pronounced at low speeds. Accordingly, the dynamic seal may be advantageously used for low speed and low static friction applications. For example, the dynamic seal may be particularly useful to reduce the initial friction experienced at "start-up" of a machine, i.e. when progressing from static to a slow speed. In addition, there may be no need to replace the lubricating oil during its working lifetime.

The fatty acid ester incorporated into the fabric may to some extent function as a lubricant itself.

Further parts of the dynamic seal may be formed of any suitable material, for example, metal or alloys such as steel, a polymeric material and/or an elastomeric material. A preferred material is an elastomer. Suitable elastomers include, for example, fluoroelastomers (FKM), perfluoroelastomers (FFKM), nitrile butadiene rubber (NBR), hydrogenated nitrile butadiene rubber (HNBR), carboxylated nitrile butadiene rubber (XNBR), silicone (VMQ), polyurethane (PU), thermoplastic polyurethane (TPU) and thermoplastic elastomers (TPE). The dynamic seal may be a lip seal comprising, for example, a seal body (formed of, for example, metal) and a seal lip (formed of, for example, an elastomer).

Such materials may provide good sealing performance and high resistance to lubricating oils at elevated temperature, and are low cost.

The contact surface of the dynamic seal may be capable of absorbing oil. This may provide a suitable reservoir of oil for re-supply to the contact surface, in use.

The dynamic seals may be used to seal passages between machine components that move relative to each other, either linearly or in the circumferential direction. The dynamic seal may be, for example, an engine seal (such as, for example, a valve stem seal, a crankshaft seal or a shaft seal), an O-ring seal, a steering seal, a suspension seal, a piston seal, a wheel end seal, a power transmission seal, a pneumatic seal, a hydraulic seal, a fluid handing seals or an aerospace shaft seal.

The contact surface of the dynamic seal provides a fabric and the fatty acid ester is incorporated into the fabric. The fabric may be particularly effective at adsorbing lubricating oil and subsequently releasing lubricating oil to the contact surface. In use, the lubricating oil may be free to move within the fabric. This may dissipate heat from the contact surface, thereby reducing the temperature of the sliding surfaces, in use.

The fabric is typically disposed on the contact surface of the dynamic seal as a continuous strip along, for example, the outer circumference of the dynamic seal. Alternatively, the fabric may be disposed over substantially the entire surface of the dynamic seal. The fabric is typically at least 100 microns thick, more typically from 150 to 900 microns thick.

The fabric may be attached to the dynamic seal using any suitable bonding or joining technique. For example, an adhesive may be used. The choice of adhesive will depend on the nature of underlying seal material (for example metal, alloy, polymer or elastomer) and the nature of the fabric (for example cotton or silk) to be attached, but in all cases it is chosen to ensure a strong bond between the underlying seal material and the fabric. For polymeric or elastomeric seal materials, a suitable adhesive is a cyanoacrylate adhesive and/or a water-based polyurethane adhesive. Such an adhesive can be used to bond the fabric to the dynamic seal at its contact surface, i.e. the surface of the seal which will be in sliding contact with the sliding surfaces.

The fabric may provide, for example, cotton (e.g. Ventile®) and/or silk and/or man-made fibres such as, for example, poly(aramids). Such materials exhibit favourable mechanical properties, are easy to apply to a dynamic seal and are capable of absorbing high levels of lubricant oil. A fatty acid ester may be formed by reacting a fatty acid and/or fatty acid chloride with one or more of the hydroxyl groups present in the cellulose of cotton and the fibroin of silk. Such esterification reactions are known in the art. When the fabric provides cotton, fatty acid ester groups may be formed with all of the hydroxyl groups on one or more of the D-glucose units of the cellulose. Alternatively, the fatty acid ester groups may be formed with only one or two of the hydroxyl groups on one or more of the D-glucose units of the cellulose. In other words, the fatty acid ester may be a mono-, di-, or tri-ester.

The fatty acid ester is typically situated at the surface of the fibres making up the fabric. The fatty acid ester at the surface may help to increase the oleophilicity of the fabric. The fibres may be partially formed of the fatty acid ester. Alternatively, the fibres may be substantially formed of the fatty acid ester. The fatty acid ester may be present substantially only at the surface of the fibres making up the fabric. For example, when the fabric provides cotton, the fibres may contain cellulose fatty acid ester at the surface in order to increase oleophilicity, whereas the interior of the fibres may provide cellulose to provide favourable mechanical properties to the fabric.

The fabric preferably provides a woven fabric. The term woven fabric used herein encompasses a fabric formed by, for example, weaving, knitting, crocheting and/or knotting. Woven fabrics may have high strength and may be capable of retaining high levels of lubricant oil within the weave. A woven fabric provides a regular, patterned surface. Such a patterned or "dimpled" surface may result in reduced friction. A woven fabric may exhibit advantages over other pattered surfaces that have been machined or moulded. For example, a woven fabric is inexpensive and avoids the cost and complexity of producing complex engineered surfaces. A woven fabric has some flexibility in its structure, so may be more resilient to asperities and features on the countersurface that could wear away the structure. A woven fabric may also exhibit a wicking effect, in which oil is absorbed on the peripheral regions and replenished at more central, load bearing regions. This regulation of oil concentrations may improve the uniformity of the lubricating film of oil and also remove the tendency of oil starvation in some areas to help maintain lower friction.

The woven fabric is preferably very uniformly and tightly woven. An example of such a woven fabric is Ventile® cotton. The woven fabric may advantageously have greater than 50 warp threads per cm, preferably from 60 to 120 warp threads per cm, more preferably from 65 to 100 warp threads per cm, and/or greater than 20 weft threads per cm, preferably from 22 to 40 warp threads per cm, more preferably from 25 to 38 warp threads per cm. The woven fabric may advantageously have a weight of greater than 150 gsm, preferably from 60 to 35 gsm. For the same thickness, a tightly and uniformly woven fabric exhibits greater strength/durability, higher fibre density and a smoother/flatter surface in comparison to non-tightly and/or non-uniformly woven fabrics. Greater strength/durability may be advantageous when the dynamic seal is to be used in a sealing environment where the contact force is at substantial pressure and elevated temperatures. In addition, greater strength/durability may be advantageous when the dynamic seal is used to seal fast rotating or sliding counterfaces in view of the vibrations and considerable shear forces applied. A higher density of fibres may advantageously avoid gaps for either oil to leave or dirt/water/ingress to physically enter the seal. A smoother, more uniform surface may be more likely to provide better sealing performance as it may ensure a more regular pressure distribution across the seal surface.

The fatty acid ester preferably provides cellulose fatty acid ester. Such a material may exhibit particularly favourable levels of oleophilicity, and the contact surface may therefore be particularly effective at absorption and subsequent release of lubricating oil. In addition, a cellulose fatty acid may be easily incorporated into a cellulose fabric, such as for example a cotton fabric, by a simple esterification reaction. Esterification reactions are known in the art.

The cellulose fatty acid ester preferably provides cellulose palmitoylate and/or cellulose decyl ester. Such species may exhibit particularly favourable levels of oleophilicity, and the contact surface of the dynamic seal may therefore be particularly effective at absorption and subsequent release of lubricating oil.

The cellulose preferably provides beta-cellulose. When the fabric provides beta-cellulose, the fabric may have a greater capacity for containing oil. In addition, the fabric may exhibit more favourable mechanical properties. Alpha-cellulose, which is the polymorph of cellulose typically found in cotton, may be transformed to beta-cellulose by mercerisation. Mecerisation typically involves treating the cotton with sodium hydroxide. Mercerisation techniques are known in the art. Transformation to beta-cellulose may also be achieved by, for example, an enzyme treatment or a non-caustic scouring treatment. Such techniques are known in the art. The mercerisation, enzyme and non-caustic techniques may help break down the cellulose structure into smaller fibrils, even down to nano fibrils, which may increase the lubricating performance of the fabric.

The fatty acid ester preferably provides a carbon chain having at least 6 carbon atoms, preferably at least 13 carbon atoms. Longer carbon chains increase the oleophilic nature of the fatty acid ester. Accordingly, the fabric may therefore be particularly effective at absorption and subsequent release of lubricating oil.

In a further aspect, the present invention provides a bearing comprising the dynamic seal as described herein.

The inventors have surprisingly found that the bearing exhibits a low working friction. The bearing may be, for example, a plain bearing or a rolling element bearing.

In a further aspect, the present invention provides a rolling element bearing comprising:
  an inner ring;
  an outer ring;
  a plurality of rolling elements disposed between an outer surface of the inner ring and an inner surface of the outer ring; and
  a dynamic seal as described herein, wherein the contact surface of the dynamic seal is arranged to be in sliding contact with the inner ring or the outer ring, in use.

The inventors have surprisingly found that the rolling element bearing of the present invention exhibits a low working friction.

The dynamic seal typically extends from the inner ring to the outer ring and provides an annular surface that faces the plurality of rolling elements. The dynamic seal may be attached to the outer ring of the bearing. In this case, in use, the contact surface (typically the radially innermost edge) of the dynamic seal will be in rotational sliding sealing contact with the inner ring. Alternatively, the dynamic seal may be attached to the inner ring of the bearing. In this case, in use, the contact surface (typically the radially outermost edge) of the dynamic seal will be in rotational sliding sealing contact with the outer ring. The bearing preferably provides a dynamic seal positioned each side of the rolling elements in the axial direction.

Prior to use, the bearing is loaded with a lubricant, typically oil, to lubricate the relative motion of the dynamic seal with the inner ring or outer ring. In use, such relative motion, particularly at high speed, may cause lubricant to become distributed away from the contact surface between the dynamic seal with the inner ring or outer ring The fatty acid ester, in particular the long aliphatic tail of the fatty acid ester, is oleophilic. Accordingly, in use, when the bearing is loaded with lubricating oil, the fatty acid ester at the contact surface may maintain a lubricating layer of oil molecules at the contact surface. As a result, the friction of the bearing is reduced, thereby reducing the working torque and increasing the working lifetime of the bearing. The reduced friction may be exhibited over a wide range of operating temperatures and operating speeds. In addition, there may be no need to replace the lubricating oil during its working lifetime.

The inner ring typically sits concentrically within the outer ring. One or both of the inner and outer rings will typically be formed of a bearing steel. Examples of bearing steels include: through-hardened carbon chromium steel (100Cr6) containing approximately 1% carbon and 1.5% chromium according to ISO 683-17:1999; chromium-nickel and manganese-chromium alloyed steels according to ISO 683-17:1999 with a carbon content of approximately 0.15%; high chromium content steels X65Cr14 according to ISO 683-17:1999 and X105CrMo17 according to EN 10088-1:1995; and highly alloyed steels such as 80MoCrV42-16 manufactured to ISO 683-17:1999.

The rolling elements may provide, for example, balls, rollers, discs and/or tapered rolling elements. These may be formed from, for example, a bearing steel as herein described or, alternatively, from a ceramic material such as silicon nitride.

The dynamic seal in the bearing may be annular in shape. Alternatively, the dynamic seal may be, for example, in the shape of a disk or hemisphere.

The fabric of the dynamic seal may be loaded with lubricant oil to lubricate the relative motion of the dynamic seal with either the inner ring or the outer ring.

BRIEF DESCRIPTION OF THE SEVERAL VIEWS OF THE DRAWING

The present invention will now be described further, by way of example, with reference to the following non-limiting drawings in which.

DETAILED DESCRIPTION OF THE INVENTION

The invention will now be described with reference to the Figures and the following non-limiting Examples.

Figure 1:
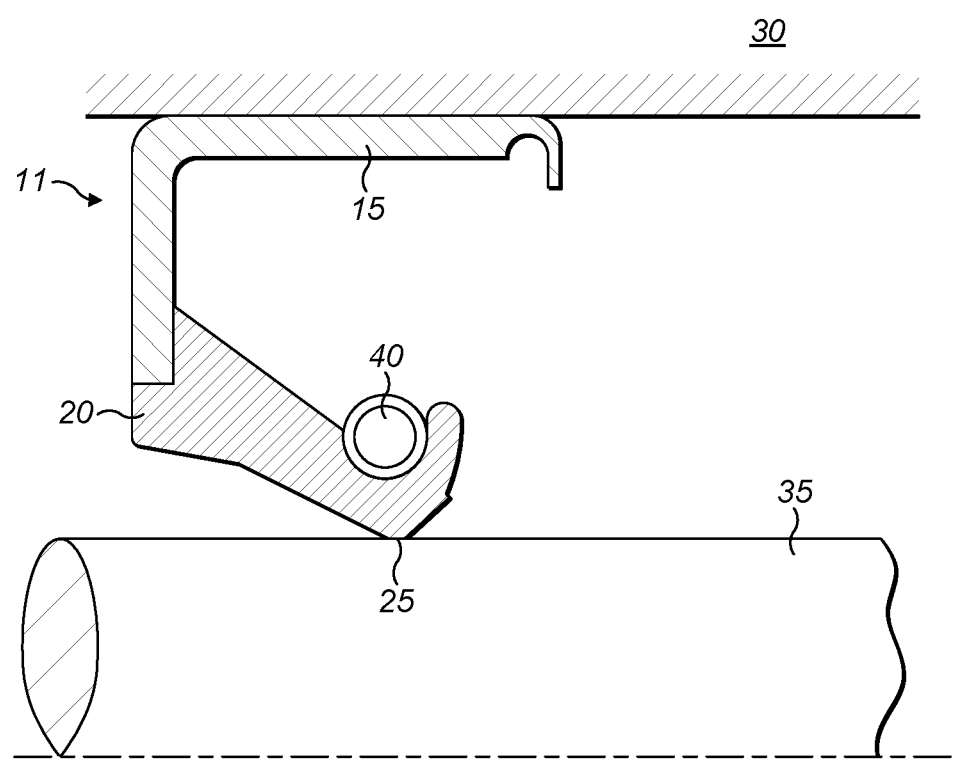
FIG. 1 shows a cross-section of part of a seal according to the invention.

FIG. 1 shows an example of a shaft seal 11 comprising a metal casing 15 to which an elastomeric sealing lip 20 has been bonded. The sealing lip 20 is formed of an elastomer.

The seal is mounted in an annular gap between the bore of a bearing housing 30 and a shaft 35, whereby the sealing lip 20 has a contact surface 25 which bears against a counterface on the shaft 35. To ensure that the lip remains in contact with the shaft, the lip is preloaded with a garter spring 40. The contact surface 25 provides a fabric (not shown) having a fatty acid ester (not shown) incorporated therein.

Figure 2:
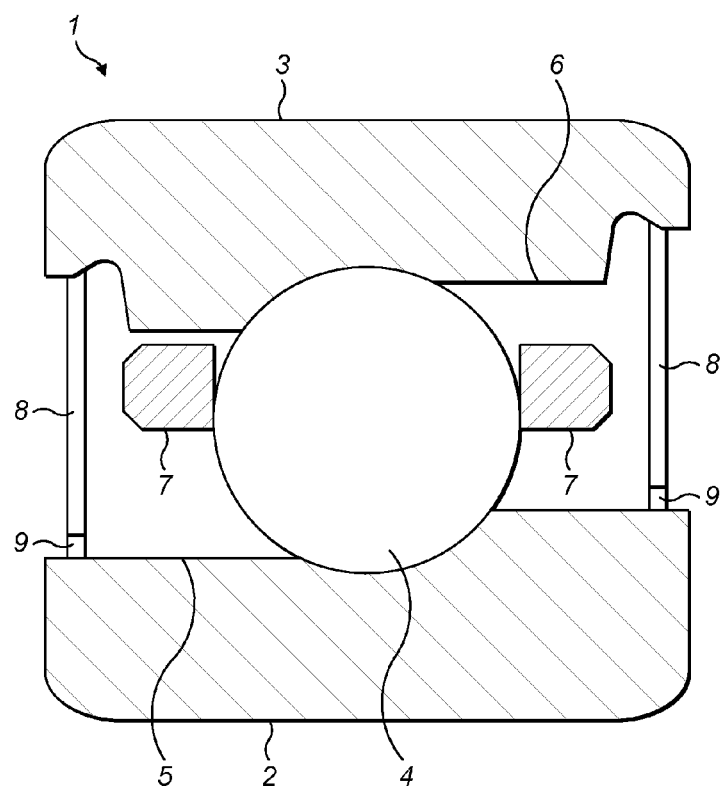
FIG. 2 shows a cross-sectional view of part of a first embodiment of a rolling element bearing according to the present invention.
Figure 3:
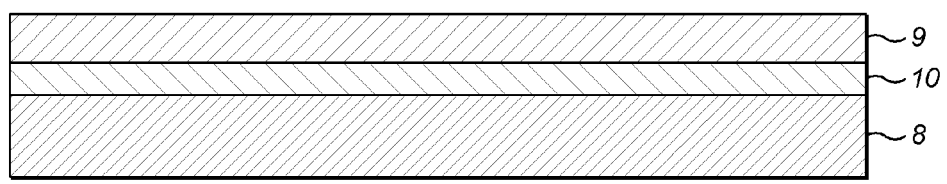
FIG. 3 shows a cross-sectional view of part of a bearing seal according to the present invention.

Referring to FIGS. 2 and 3, an embodiment of a rolling element bearing 1 in accordance with the present invention is shown comprising an inner ring 2, an outer ring 3 and a plurality of rolling elements 4 (in this case a ball, only one rolling element shown) disposed between an outer surface 5 of the inner ring 2 and an inner surface 6 of the outer ring 3. The rolling elements 4 are preferably contained in a ball cage 7.

The rolling element bearing 1 has bearing seals 8 positioned either side of the rolling elements 4 in the axial direction. The bearing seals extend from the outer ring to the inner ring. A counter surface at the radially innermost edge of each bearing seal 8 is provided with a fabric 9, which is in sliding contact with the outer surface 5 of the inner ring 2 during bearing operation. The fabric 9 provides a fatty acid ester.

FIG. 3 shows a close-up of the contact surface of the bearing seal 8 of the rolling element bearing 1 shown in FIG. 2. As shown in FIG. 3, fabric 9 is bonded to bearing seal 8 by an adhesive layer 10.

Prior to use, the bearing may be loaded with lubricating oil (not shown). In use, due to its oleophilic nature, fabric 9 becomes impregnated with lubricating oil. This serves to maintain a layer of lubricating oil between bearing seal 8 and the outer surface 5 of the inner ring 6, thereby reducing friction between the bearing seal 8 and the outer surface 5 of the inner ring 6.

While the bearing 1 shown in FIG. 2 is asymmetric (for reasons of ease of assembly), this is not essential, and the invention may be applied to other types of bearing 1, including symmetric and/or split types.

Example 1

An oleophilic treatment on a dry, finely woven Ventile® cotton textile was performed by placing a small piece of the textile (~10 cm×10 cm) into a dilute solution of palmitoyl chloride in toluene (70 ml, 2.8% w/v). Swirling of the textile in solution textile was maintained for 2 minutes to help enable full saturation of the textile, followed by heating of the solution to 50° C. and maintaining that temperature for 30 minutes. The sample was then removed from the solution and excess solution forced out of the textile, followed by washing the treated textile in a solution of triethylamine in 2-propanol (100 ml, 10% v/v). Repeat rinsing in 2-propanol then water was then performed to remove side products and other impurities. The textile was then dried under gentle heating until all solvent was removed.

A single circular ring was cut from the treated textile and bonded onto the surface of an FKM test ring of diameter ~5 cm and 2 mm surface contact using a thin layer of cyanoacrylate adhesive. The sample was then immersed in a semi-synthetic 5W-30 engine oil for 30 minutes until full saturation into the textile was achieved, after which the excess oil was removed by wiping and then contacting the surface of the textile with a surfactant-free tissue until no oil residue was left on the tissue.

The dynamic friction of the test ring was then tested in a tribometer (CETR UMT-3) at 25° C. and 0.2 MPa contact pressure for a series of increasing rotational speeds at 10 rpm, 20 rpm, 50 rpm, 100 rpm, 200 rpm, 500 rpm, 1000 rpm and 2000 rpm for 30 seconds each. This sequence was then run in reverse order to 20 rpm under the same conditions. Prior to testing for different speeds the sample was run in for several minutes at ambient and 0.2 MPa at 100 rpm. Testing of the sample was repeated with data measured between a duration of 10-30 s of each test speed. An average of the coefficient of dynamic friction (dynamic COF) together with the range between the highest and lowest values was recorded. The results are set out in Table 1 below.

TABLE 1

Example 1 - Oil saturated oleophilic polymer coating (contact pressure = 0.2 MPa)

| | Dynamic COF | |
|---|---|---|
| | Average | Range |
| rpm (ascending) | | |
| 10 | 0.16 | 0.16-0.17 |
| 20 | 0.17 | 0.165-0.17 |
| 50 | 0.18 | 0.17-0.18 |
| 100 | 0.19 | 0.185-0.19 |
| 200 | 0.21 | 0.20-0.21 |
| 500 | 0.23 | 0.23 |
| 1000 | 0.25 | 0.24-0.25 |
| 2000 | 0.26 | 0.25-0.26 |
| rpm (descending) | | |
| 1000 | 0.24 | 0.235-0.24 |
| 500 | 0.22 | 0.22 |
| 200 | 0.20 | 0.20 |
| 100 | 0.19 | 0.185-0.19 |
| 50 | 0.18 | 0.175-0.18 |
| 20 | 0.17 | 0.165-0.17 |

Comparative Example 1

An FKM reference sample of identical dimensions without a coating was tested and under the same conditions using only lubrication with a premium, mineral oil based grease at 0.2 MPa and 0.5 MPa contact pressure. The results are set out in Tables 2 and 3 below.

TABLE 2

Comparative Example 1 - FKM elastomer with premium, mineral oil based grease (contact pressure = 0.2 MPa)

| | Dynamic COF | |
|---|---|---|
| | Average | Range |
| rpm (ascending) | | |
| 10 | 0.34 | 0.31-0.36 |
| 20 | 0.37 | 0.34-0.42 |
| 50 | 0.35 | 0.34-0.36 |
| 100 | 0.47 | 0.42-0.49 |
| 200 | 0.63 | 0.51-0.70 |
| 500 | 0.73 | 0.64-0.82 |
| 1000 | 0.61 | 0.60-0.63 |
| 2000 | 0.47 | 0.43-0.51 |
| rpm (descending) | | |
| 1000 | 0.54 | 0.52-0.55 |
| 500 | 0.72 | 0.70-0.74 |
| 200 | 0.50 | 0.48-0.52 |
| 100 | 0.38 | 0.36-0.39 |
| 50 | 0.31 | 0.30-0.31 |
| 20 | 0.30 | 0.28-0.31 |

TABLE 3

Comparative Example 1 - FKM elastomer with a premium, mineral oil based grease (contact pressure = 0.5 MPa)

| | Dynamic COF | |
| --- | --- | --- |
| | Average | Range |
| rpm (ascending) | | |
| 10 | 0.27 | 0.24-0.3 |
| 20 | 0.26 | 0.24-0.27 |
| 50 | 0.27 | 0.25-0.29 |
| 100 | 0.29 | 0.28-0.32 |
| 200 | 0.33 | 0.32-0.36 |
| 500 | 0.34 | 0.34-0.36 |
| 1000 | 0.35 | 0.34-0.35 |
| 2000 | 0.30 | 0.29-0.31 |
| rpm (descending) | | |
| 1000 | 0.29 | 0.28-0.29 |
| 500 | 0.28 | 0.27-0.28 |
| 200 | 0.26 | 0.24-0.27 |
| 100 | 0.25 | 0.24-0.26 |
| 50 | 0.25 | 0.24-0.26 |
| 20 | 0.23 | 0.23-0.24 |

It can be seen that the dynamic coefficient of friction of Comparative Example 1 is higher than that of Example 1 over a range of speeds and pressures

Example 2

A sample of finely woven cotton material bonded to an FKM elastomer test ring was made in an identical way to that Example 1. The textile layer was then instead saturated with a fully synthetic 5W-30 engine oil for 30 minutes until full saturation into the textile was achieved, after which the excess oil was removed by wiping and then contacting the surface of the textile with a surfactant-free tissue until no oil residue was left on the tissue. The dynamic friction of the test ring was then tested using the same protocol as for Example 1. The results are shown in Table 4 below.

TABLE 4

Example 2 - oil saturated oleophilic polymer coating (contact pressure 0.2 MPa)

| | Dynamic COF | |
| --- | --- | --- |
| | Average | Range |
| rpm (ascending) | | |
| 10 | 0.18 | 0.17-0.18 |
| 20 | 0.17 | 0.17-0.18 |
| 50 | 0.17 | 0.16-0.17 |
| 100 | 0.17 | 0.16-0.17 |
| 200 | 0.19 | 0.17-0.19 |
| 500 | 0.22 | 0.20-0.22 |
| 1000 | 0.24 | 0.21-0.28 |
| 2000 | 0.25 | 0.24-0.30 |
| rpm (descending) | | |
| 1000 | 0.23 | 0.22-0.23 |
| 500 | 0.20 | 0.20-0.21 |
| 200 | 0.19 | 0.18-0.19 |
| 100 | 0.18 | 0.18-0.19 |
| 50 | 0.17 | 0.16-0.17 |
| 20 | 0.17 | 0.16-0.17 |

Comparative Example 2

An FKM reference sample of identical dimensions to Example 2 but without a coating was tested and under the same conditions using only lubrication with a premium, mineral oil based grease at 0.2 MPa and 0.5 MPa contact pressure. The results are set out in Tables 5 and 6 below.

TABLE 5

Comparative Example 2 - FKM elastomer with a premium, mineral oil based grease (contact pressure = 0.2 MPa)

| | Dynamic COF | |
| --- | --- | --- |
| | Average | Range |
| rpm (ascending) | | |
| 10 | 0.34 | 0.31-0.36 |
| 20 | 0.37 | 0.34-0.42 |
| 50 | 0.35 | 0.34-0.36 |
| 100 | 0.47 | 0.42-0.49 |
| 200 | 0.63 | 0.51-0.70 |
| 500 | 0.73 | 0.64-0.82 |
| 1000 | 0.61 | 0.60-0.63 |
| 2000 | 0.47 | 0.43-0.51 |
| rpm (descending) | | |
| 1000 | 0.54 | 0.52-0.55 |
| 500 | 0.72 | 0.70-0.74 |
| 200 | 0.50 | 0.48-0.52 |
| 100 | 0.38 | 0.36-0.39 |
| 50 | 0.31 | 0.30-0.31 |
| 20 | 0.30 | 0.28-0.31 |

TABLE 6

Comparative Example 2 - FKM elastomer with a premium, mineral oil based grease (contact pressure = 0.5 MPa)

| | Dynamic COF | |
| --- | --- | --- |
| | Average | Range |
| rpm (ascending) | | |
| 10 | 0.27 | 0.24-0.3 |
| 20 | 0.26 | 0.24-0.27 |
| 50 | 0.27 | 0.25-0.29 |
| 100 | 0.29 | 0.28-0.32 |
| 200 | 0.33 | 0.32-0.36 |
| 500 | 0.34 | 0.34-0.36 |
| 1000 | 0.35 | 0.34-0.35 |
| 2000 | 0.30 | 0.29-0.31 |
| rpm (descending) | | |
| 1000 | 0.29 | 0.28-0.29 |
| 500 | 0.28 | 0.27-0.28 |
| 200 | 0.26 | 0.24-0.27 |
| 100 | 0.25 | 0.24-0.26 |
| 50 | 0.25 | 0.24-0.26 |
| 20 | 0.23 | 0.23-0.24 |

It can be seen that the dynamic coefficient of friction of Comparative Example 2 is higher than that of Example 2 over a range of speeds and pressures.

Comparative Example 3

An FKM reference sample of identical dimensions to Example 2 but without a coating was tested and under the same conditions using only lubrication with a synthetic 5W-30 engine oil (the same lubrication as Example 2) at 0.2

MPa and 0.5 MPa contact pressures. The results are set out in Tables 7 and 8 below.

FKM elastomer with fully synthetic 5W-30 engine oil (Contact pressure=0.5 MPa)

TABLE 7

Comparative Example 3 - FKM elastomer with fully synthetic 5W-30 engine oil (contact pressure = 0.5 MPa)

|  | Dynamic COF | |
| --- | --- | --- |
|  | Average | Range |
| rpm (ascending) | | |
| 10 | 0.42 | 0.39-0.46 |
| 20 | 0.38 | 0.37-0.39 |
| 50 | 0.34 | 0.33-0.35 |
| 100 | 0.32 | 0.32-0.33 |
| 200 | 0.33 | 0.32-0.34 |
| 500 | 0.35 | 0.34-0.36 |
| 1000 | 0.35 | 0.34-0.36 |
| 2000 | 0.32 | 0.31-0.33 |
| rpm (descending) | | |
| 1000 | 0.32 | 0.31-0.32 |
| 500 | 0.32 | 0.31-0.32 |
| 200 | 0.32 | 0.31-0.32 |
| 100 | 0.33 | 0.32-0.33 |
| 50 | 0.35 | 0.34-0.35 |
| 20 | 0.37 | 0.36-0.37 |

TABLE 8

Comparative Example 3 - FKM elastomer with fully synthetic 5W-30 engine oil (contact pressure = 0.2 MPa)

|  | Dynamic COF | |
| --- | --- | --- |
|  | Average | Range |
| rpm (ascending) | | |
| 10 | 0.55 | 0.50-0.60 |
| 20 | 0.50 | 0.49-0.51 |
| 50 | 0.46 | 0.44-0.47 |
| 100 | 0.45 | 0.44-0.46 |
| 200 | 0.47 | 0.46-0.47 |
| 500 | 0.52 | 0.51-0.52 |
| 1000 | 0.53 | 0.52-0.54 |
| 2000 | 0.47 | 0.46-0.48 |
| rpm (descending) | | |
| 1000 | 0.48 | 0.48-0.49 |
| 500 | 0.46 | 0.46-0.47 |
| 200 | 0.45 | 0.44-0.46 |
| 100 | 0.45 | 0.44-0.46 |
| 50 | 0.47 | 0.45-0.48 |
| 20 | 0.52 | 0.51-0.52 |

It can be seen that the dynamic coefficient of friction of Comparative Example 3 is higher than that of Example 2 over a range of speeds and pressures.

The foregoing detailed description has been provided by way of explanation and illustration, and is not intended to limit the scope of the appended claims. Many variations in the presently preferred embodiments illustrated herein will be apparent to one of ordinary skill in the art, and remain within the scope of the appended claims and their equivalents.

The invention claimed is:

1. A dynamic seal having a contact surface comprising: a fabric, wherein a fatty acid ester is incorporated into the fabric and wherein the fabric is impregnated with a lubricating oil.

2. The dynamic seal of claim 1, wherein the fabric comprises a woven fabric.

3. The dynamic seal of claim 1, wherein the fatty acid ester comprises cellulose fatty acid ester.

4. The dynamic seal of claim 3, wherein the cellulose fatty acid ester comprises cellulose palmitoylate and/or cellulose decyl ester.

5. The dynamic seal of claim 3, wherein the cellulose comprises beta-cellulose.

6. The dynamic seal of claim 1, wherein the fatty acid ester comprises a carbon chain having at least 13 carbon atoms.

7. A machine arrangement including the dynamic seal of claim 1.

8. A dynamic seal having a contact surface comprising: a fabric, wherein a fatty acid ester is incorporated into the fabric, and wherein the dynamic seal comprises an elastomer.

9. The dynamic seal of claim 8, wherein the elastomer is a fluoroelastomer.

10. The dynamic seal of claim 8, wherein the fabric is impregnated with a lubricating oil.

11. The dynamic seal of claim 8, wherein the fatty acid ester comprises cellulose fatty acid ester.

12. The dynamic seal of claim 11, wherein the cellulose fatty acid ester comprises cellulose palmitoylate and/or cellulose decyl ester.

13. The dynamic seal of claim 8, wherein the fatty acid ester comprises a carbon chain having at least 13 carbon atoms.

14. A rolling element bearing comprising:
   an inner ring;
   an outer ring;
   a plurality of rolling elements disposed between an outer surface of the inner ring and an inner surface of the outer ring; and
   a dynamic seal having a contact surface including a fabric, wherein a fatty acid ester is incorporated into the fabric, and
   wherein the contact surface of the dynamic seal is arranged to be in sliding contact with the inner ring or the outer ring.

15. The bearing of claim 14, wherein the fabric of the dynamic seal is loaded with lubricant oil to lubricate the relative motion of the dynamic seal with either the inner ring or the outer ring.

16. The bearing of claim 15, wherein the dynamic seal comprises an elastomer.

17. The bearing of claim 14, wherein the fabric comprises a woven fabric.

18. The bearing of claim 14, wherein the fatty acid ester comprises cellulose fatty acid ester.

19. The bearing of claim 18, wherein the cellulose fatty acid ester comprises cellulose palmitoylate and/or cellulose decyl ester.

20. The bearing of claim 14, wherein the fatty acid ester comprises a carbon chain having at least 13 carbon atoms.

* * * * *